US012002195B2

United States Patent
Xie et al.

(10) Patent No.: US 12,002,195 B2
(45) Date of Patent: Jun. 4, 2024

(54) COMPUTER VISION-BASED ANOMALY DETECTION METHOD, DEVICE AND ELECTRONIC APPARATUS

(71) Applicant: GOERTEK INC., Shandong (CN)

(72) Inventors: Fuli Xie, Shandong (CN); Yifan Zhang, Shandong (CN); Jie Liu, Shandong (CN); Jifeng Tian, Shandong (CN)

(73) Assignee: GOERTEK INC., Shandong (CN)

( * ) Notice: Subject to any disclaimer, the term of this patent is extended or adjusted under 35 U.S.C. 154(b) by 509 days.

(21) Appl. No.: 17/309,306

(22) PCT Filed: Oct. 24, 2020

(86) PCT No.: PCT/CN2020/123475
§ 371 (c)(1),
(2) Date: May 18, 2021

(87) PCT Pub. No.: WO2021/114896
PCT Pub. Date: Jun. 17, 2021

(65) Prior Publication Data
US 2022/0309635 A1 Sep. 29, 2022

(30) Foreign Application Priority Data
Dec. 10, 2019 (CN) .................. 201911258334.8

(51) Int. Cl.
*G06T 7/00* (2017.01)
*G06T 3/40* (2006.01)
*G06T 7/11* (2017.01)

(52) U.S. Cl.
CPC .............. *G06T 7/001* (2013.01); *G06T 3/40* (2013.01); *G06T 7/11* (2017.01); *G06T 2207/20081* (2013.01); *G06T 2207/20084* (2013.01)

(58) Field of Classification Search
CPC ... G06T 7/001; G06T 3/40; G06T 7/11; G06T 2207/20081; G06T 2207/20084; G06T 2207/20021; G06T 7/0002
See application file for complete search history.

(56) References Cited

U.S. PATENT DOCUMENTS

| 8,705,866 B2 | 4/2014 | Zhang et al. |
| 10,624,558 B2 * | 4/2020 | Ceccaldi ................ A61B 5/055 |
| 2017/0270658 A1 | 9/2017 | Kaneko |

FOREIGN PATENT DOCUMENTS

| CN | 101996308 A | 3/2011 |
| CN | 102609680 A | 7/2012 |

(Continued)

OTHER PUBLICATIONS

Yu Kewei, Research on Defect Detection of Workpiece based on Convolutional Neural Network, China Computer&Communication, Nov. 15, 2018, China, Beijing.

*Primary Examiner* — Hwa Andrew Lee
(74) *Attorney, Agent, or Firm* — LKGlobal | Lorenz & Kopf, LLP

(57) ABSTRACT

A computer vision-based anomaly detection method and device and an electronic apparatus are disclosed. The method comprises: dividing a target picture into at least two feature regions according to different region features of the target picture, and forming training sets respectively using the feature regions corresponding to each target picture; selecting generative adversarial networks GAN as network models to be used, and training GAN network models with the training sets of different feature regions to obtain GAN network models corresponding to different feature regions; and when performing anomaly detection, performing same feature region division on a target picture to be detected, inputting different feature regions of the target picture to be detected into corresponding GAN network models to obtain (Continued)

a generated picture, and performing pixel value-based difference detection on the generated picture and the target picture to be detected.

16 Claims, 5 Drawing Sheets

(56) References Cited

FOREIGN PATENT DOCUMENTS

| | | |
|---|---|---|
| CN | 103226616 A | 7/2013 |
| CN | 104458748 A | 3/2015 |
| CN | 108009628 A | 5/2018 |
| CN | 109461458 A | 3/2019 |
| CN | 109584221 A | 4/2019 |
| CN | 109872313 A | 6/2019 |
| CN | 109949305 A | 6/2019 |
| CN | 110097543 A | 8/2019 |
| CN | 110135273 A | 8/2019 |
| CN | 110211114 A | 9/2019 |
| CN | 110349135 A | 10/2019 |
| CN | 111062918 A | 4/2020 |

\* cited by examiner

COMPUTER VISION-BASED ANOMALY DETECTION METHOD, DEVICE AND ELECTRONIC APPARATUS

CROSS-REFERENCE TO RELATED APPLICATION

This Application is a U.S. National-Stage entry under 35 U.S.C. § 371 based on International Application No. PCT/CN2020/123475, filed Oct. 24, 2020 which was published under PCT Article 21(2) and which claims priority to Chinese Application No. 201911258334.8, filed Dec. 10, 2019, which are all hereby incorporated herein in their entirety by reference.

TECHNICAL FIELD

This Application pertains to the technical field of anomaly detection, and in particular to a computer vision-based anomaly detection method and device and an electronic apparatus.

BACKGROUND

Computer vision refers to the use of camera and computer instead of human eyes to recognize, track, and measure targets. It can also be considered as a science of studying how to make artificial systems perceive from images or multi-dimensional data. Anomaly detection is the identification of items, events or observations which do not conform to an expected pattern or other items in a dataset. It is often used in fields such as data mining and structural defect detection. In industrial production, some products that need to be detected have different features, so an anomaly detection algorithm can be used to perform computer vision-based anomaly detection on them.

However, the conventional research and application of anomaly detection algorithms are mainly aimed at semantic level anomaly detection such as that in security inspection machines, namely, it can be judged only when there is a semantic-level anomaly in the picture. The semantic level is to group or segment the pixels according to expressing differences in semantic meanings in the image. For example, when a prohibited item (a gun) is detected in a security inspection machine, the prohibited item usually accounts for a high proportion of the screen, and there is a semantic difference between it and other components (such as other normal cases and bags) in the screen. However, there is no semantic level difference between abnormal products and normal products in industrial products, so the conventional detection methods cannot have good effects. In addition, other objects, desirable features and characteristics will become apparent from the subsequent summary and detailed description, and the appended claims, taken in conjunction with the accompanying drawings and this background.

SUMMARY

In view of the problem that the conventional anomaly detection algorithms cannot be well applied to industrial product detection, the present disclosure proposes a computer vision-based anomaly detection method and device and an electronic apparatus to overcome the above problem.

In order to achieve the above objective, the present disclosure adopts the following technical solutions.

According to an aspect of the present disclosure, there is provided a computer vision-based anomaly detection method, comprising:

dividing a target picture into at least two feature regions according to different region features of the target picture, and forming training sets respectively using the feature regions corresponding to each target picture;

selecting generative adversarial networks (GAN) as network models to be used, and training GAN network models with the training sets of different feature regions to obtain GAN network models corresponding to different feature regions; and when performing anomaly detection, performing same feature region division on a target picture to be detected, inputting different feature regions of the target picture to be detected into corresponding GAN network models to obtain a generated picture, and performing pixel value-based difference detection on the generated picture and the target picture to be detected.

According to another aspect of the present disclosure, there is provided a computer vision-based anomaly detection device, comprising:

a training set generation module, a training module, and a detection module;

the training set generation module is for dividing a target picture into at least two feature regions according to different region features of the target picture, and forming training sets respectively using the feature regions corresponding to each target picture;

the training module is for selecting generative adversarial networks (GAN) as network models to be used, and training GAN network models with the training sets of different feature regions to obtain GAN network models corresponding to different feature regions; and the detection module is for performing same feature region division on a target picture to be detected, inputting different feature regions of the target picture to be detected into corresponding GAN network models to obtain a generated picture, and performing pixel value-based difference detection on the generated picture and the target picture to be detected.

According to yet another aspect of the present disclosure, there is provided an electronic apparatus comprising: a processor; and a memory arranged to store computer executable instructions, wherein the executable instructions, when executed, cause the processor to perform the above method.

In sum, the beneficial effects of the present disclosure are as follows.

The present disclosure obtains the training sets by dividing the target picture into different feature regions, trains and obtains GAN network models corresponding to each feature region, inputs different feature regions of the target picture to be detected by means of the GAN network models after trained to obtain a generated picture, and then performs pixel value-based difference detection on the generated picture and the target picture to be detected to judge whether the target to be detected is normal. Since the present disclosure performs division of different feature regions and pixel level difference detection on the target picture, the accuracy of judgment on whether the target is normal is improved.

BRIEF DESCRIPTION OF DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

In order to make the objectives, technical solutions and advantages of the present disclosure clearer, the embodiments of the present disclosure will be described in further detail below in conjunction with the accompanying drawings.

In description of the present disclosure, it should be noted that, orientation or positional relationship indicated by the terms "center", "upper", "lower", "left", "right", "vertical", "horizontal", "inside", "outside", etc. are orientation or positional relationship based on the drawings, which are merely for convenience of describing the present disclosure and simplifying the description, rather than indicating or implying that the device or component referred to must have a specific orientation, or must be constructed and operated with a specific orientation, so they should not be construed as limiting the present disclosure. Moreover, the terms "first", "second" and "third" are used for descriptive purposes only and are not to be construed as indicating or implying relative importance.

In the description of the present disclosure, it should be noted that, unless otherwise expressly specified and limited, the terms "installation", "connected", "connection" should be broadly understood, for example, it may be fixedly connected, or removably connected, or integrally connected; it may also be mechanically connected, or electrically connected; it may also be directly connected, or indirectly connected through an middleware, or two components may be internally communicated. For a person of ordinary skill in the art, the specific meaning of the above terms in the present disclosure should be understood according to specific conditions.

The technical concept of the present disclosure is to obtain the training sets by dividing the target picture into different feature regions, train and obtain a GAN network model corresponding to each feature region, use the GAN network models after trained so that a generated picture is obtained by inputting different feature regions of the target picture to be detected, and then pixel value-based difference detection on the generated picture and the target picture to be detected is performed to judge whether the target to be detected is normal. Since the present disclosure performs division of different feature regions and pixel level difference detection on the target picture, the accuracy of judgment on whether the target is normal is improved.

Figure 1:
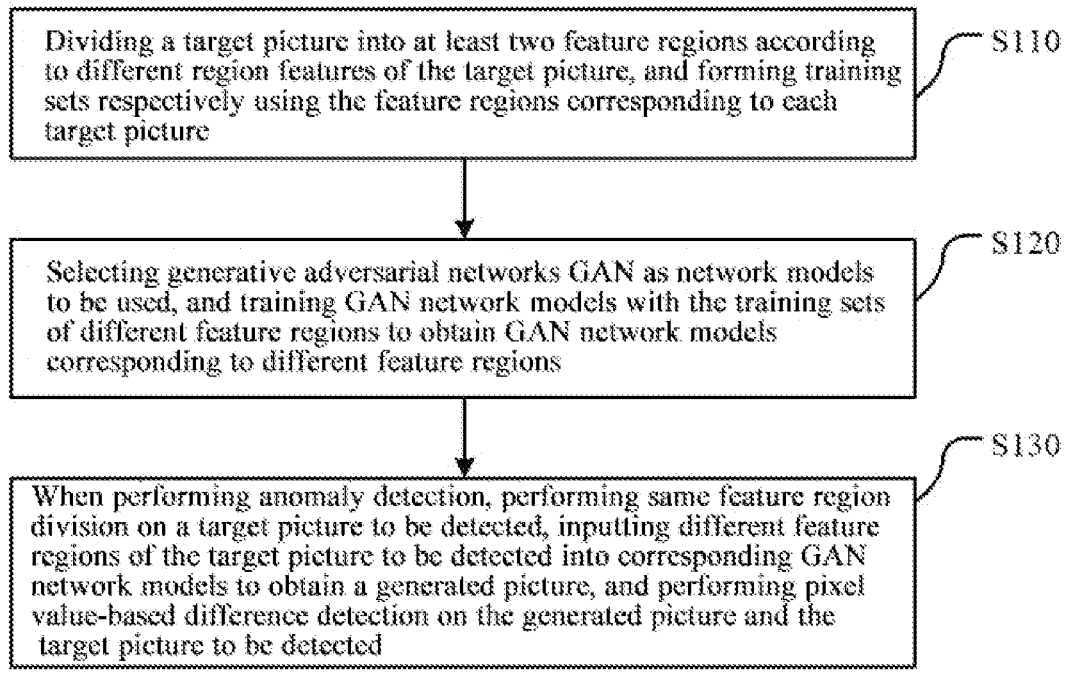
FIG. 1 is a schematic flowchart of a computer vision-based anomaly detection method according to an embodiment of the present disclosure.

FIG. 1 is the schematic flowchart of a computer vision-based anomaly detection method according to an embodiment of the present disclosure. As shown in FIG. 1, the computer vision-based anomaly detection method comprises:

Step S110: dividing a target picture into at least two feature regions according to different region features of the target picture, and forming training sets respectively using the feature regions corresponding to each target picture.

In industrial production, different regions of the products that need to be detected have different features. Based on this, the present disclosure first divides the target picture into different feature regions, processes each feature region respectively, and comprehensively judges whether the target product is normal according to whether the feature regions are normal.

Step S120: selecting generative adversarial networks (GAN) as network models to be used, and training GAN network models with the training sets of different feature regions to obtain GAN network models corresponding to different feature regions.

Figure 2:
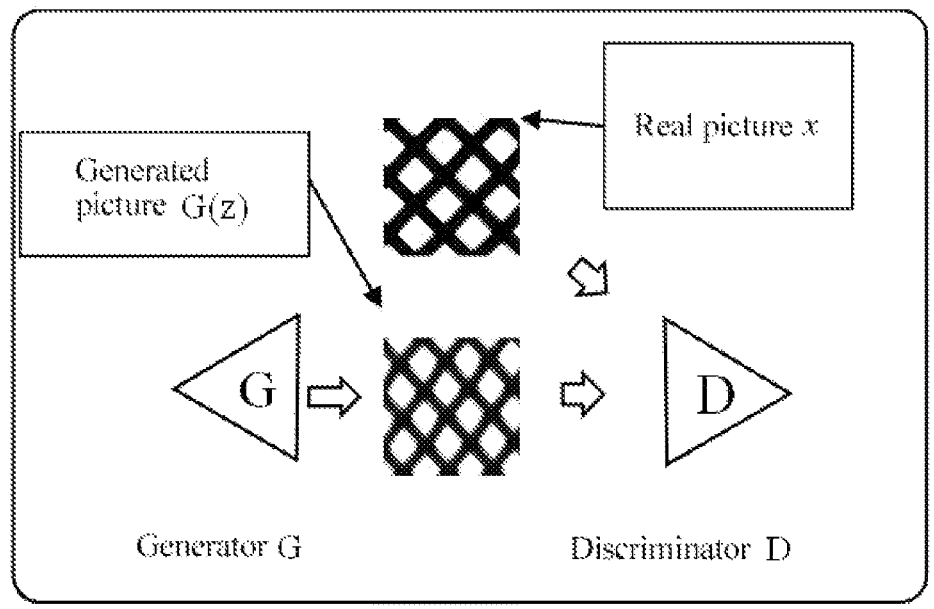
FIG. 2 is a schematic diagram of a WGAN network model training process according to an embodiment of the present disclosure.

The GAN comprises a generator G and a discriminator D (see FIG. 2). In the GAN network module after trained, the generator G first reconstructs a generated picture (e.g., the generated picture G(z)) according to an input original picture (the real picture x), and then sends the generated picture to the discriminator D for judgment. If the difference between the original picture and the generated picture reconstructed is large, the original picture can be judged to be abnormal. In other words, it can be judged whether the target is normal by calculating the difference between the original picture and the generated picture reconstructed. In the present disclosure, with respect to two or more feature regions obtained by dividing the target, corresponding GAN network models are obtained respectively by training so that comprehensive difference detection can be performed on each feature region of the target picture to be detected respectively.

Step S130: when performing anomaly detection, performing same feature region division on a target picture to be detected, inputting different feature regions of the target picture to be detected into corresponding GAN network models to obtain a generated picture, and performing pixel value-based difference detection on the generated picture and the target picture to be detected.

The present disclosure performs the same feature region division on the target picture to be detected, and uses the corresponding GAN network model obtained by training to perform pixel-level difference detection on each feature region of the target picture to be detected respectively, so it can be fully detected whether there is an anomaly in each feature region of the target picture to be detected, and it can be comprehensively judged whether the target to be detected is normal according to the results of whether each feature region is normal, and thus the accuracy of judgment on whether the target is normal is improved.

In an embodiment of the present disclosure, in step S110, forming training sets respectively using the feature regions corresponding to each target picture comprises: forming training sets respectively using feature regions of a target picture in a normal state.

In step S120, selecting generative adversarial networks (GAN) as network models to be used, and training GAN network models with the training sets of different feature regions comprises: selecting wasserstein distance-based GAN networks (WGAN) as network models to be used, and training with the training sets to obtain WGAN network models capable of generating a picture with normal target features based on an input picture.

In the present embodiment, each feature region of the target picture in a normal state is selected to form a training set, and the WGAN network model is generated by training with this training set. Since the WGAN network model has not been trained with abnormal pictures, it can only produce generated pictures with normal target features during anomaly detection. Therefore, when the input picture of the target to be detected is abnormal, the generated picture is very different from the input original picture of the target to be detected, and the anomaly of the target to be detected can be accurately judged according to the pixel value-based difference detection between the two pictures.

In an embodiment of the present disclosure, dividing a target picture into at least two feature regions according to different region features of the target picture comprises: dividing the target picture into a low diversity region and a high diversity region according to diversity of the content of the target picture.

Figure 3:
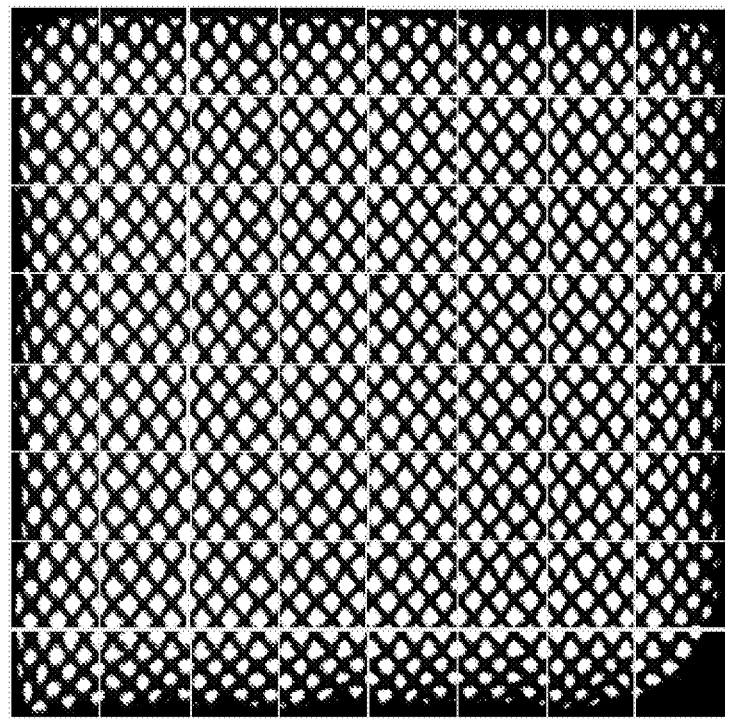
FIG. 3 is a schematic diagram of segmenting a grid-like target picture according to an embodiment of the present disclosure.
Figure 4:
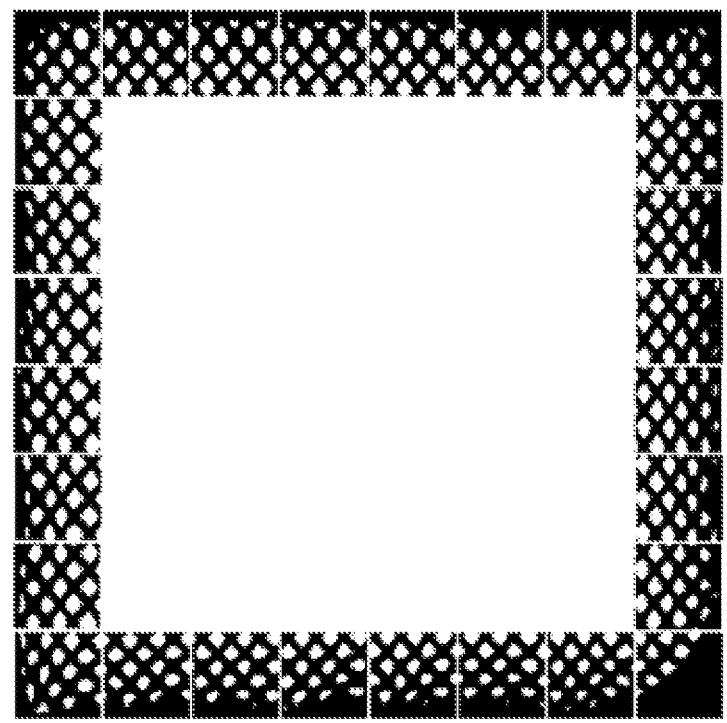
FIG. 4 is a schematic diagram of a central region and an edge region of the segmenting schematic diagram shown in FIG. 3 according to the present disclosure.

In the present embodiment, the low diversity region and the high diversity region of the target picture are respectively divided according to the diversity of the content of the target picture, and the number of the low diversity region and the high diversity region may be one or more respectively. Referring to FIG. 3, taking a grid-like product such as a mesh cloth as an example, generally the pattern in the central part of the mesh is uniform, while the pattern in the edge is deformed. Therefore, the present embodiment divides the central region of the target as the low diversity region and the edge region of the target as the high diversity region, and the complexity of the image information covered by the high diversity region is greater than the complexity of the image information covered by the low diversity region. Referring to FIG. 4, the outermost loop in the segmentation schematic diagram of FIG. 3 is divided as the high diversity region, and the inside is divided as the low diversity region.

Figure 5:
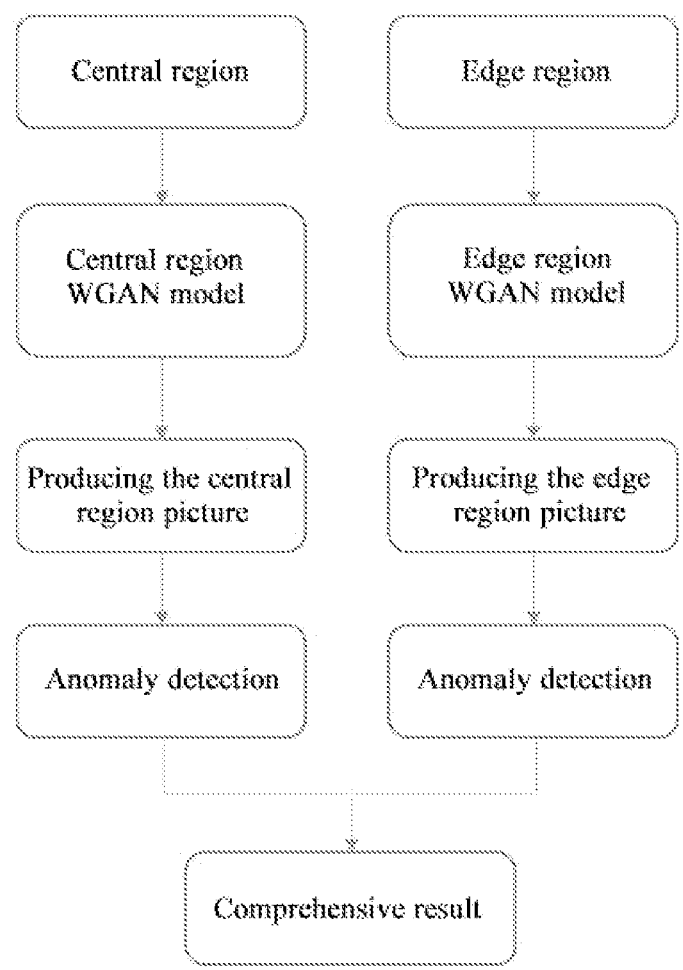
FIG. 5 is a schematic diagram of a WGAN network model detection process based on a central region and an edge region according to an embodiment of the present disclosure.

Then, as shown in FIG. 5 of the present disclosure, in the present embodiment, the WGAN network model obtained by training also includes a central region WGAN model and an edge region WGAN model. When performing the computer vision-based anomaly detection on the target picture to be detected, the target picture to be detected is also divided into the central region and the edge region, and the anomaly detection is performed on the central region and the edge region of the target picture to be detected using the corresponding WGAN model respectively. After the detection results are comprehensively processed, the final judgment on whether the target is normal is realized.

In an embodiment of the present disclosure, the method further comprises picture preprocessing to deal with the size limitation of the GAN model to process pictures, which comprises: resetting the resolution of the target picture before inputting the target picture into the GAN network model to adjust the target picture to an integer multiple of the preset pixel size, and divide the target picture into multiple pictures according to the preset pixel size.

The generation space of the GAN network cannot be too large, otherwise it will cause the network to be unstable, so the generated stable picture size is at most 64×64. However, the size of most pictures in actual detection is much larger than this value. Therefore, in the present disclosure, before inputting the target picture into the GAN network model, the original picture is integral multiple processed and segmented; at first, the resolution of the original picture is reset to an integer multiple of 64, and then it is segmented into several small pictures of a size of 64×64 (see FIG. 3 and FIG. 4). After segmenting, each small picture can be fully displayed in a size of 64×64. Of course, the size of 64×64 here is only an exemplary embodiment, and in actual applications, different preset pixel sizes may also be selected according to needs, which will not be repeated here.

In an embodiment of the present disclosure, performing pixel value-based difference detection on the generated picture and the target picture to be detected comprises:

performing difference detection on corresponding low diversity regions of the generated picture and the target picture to be detected, and when a detection result is abnormal, stopping calculation and directly determining the target to be detected as abnormal; when a detection result is normal, continuing to perform difference detection on corresponding high diversity regions of the generated picture and the target picture to be detected. In other words, in the present embodiment, first it is detected whether the low diversity region of the target picture to be detected is normal, and only after it is confirmed that the low diversity region is normal, the detection of the high diversity region is performed.

In the low diversity region, the target picture does not change much, and the diversity is not high. Therefore, even a subtle anomaly will cause a significant difference between the generated picture reconstructed by the GAN model and the input original picture. Therefore, in the present embodiment, at first, the difference detection is performed on the low diversity region, if it is judged that the low diversity region is abnormal, it is directly judged that the target to be detected is abnormal and the calculation stops; if it is judged that the low diversity region is normal, the difference detection is further performed on the high diversity region, thereby making the anomaly detection process simpler and more accurate.

Figure 6:
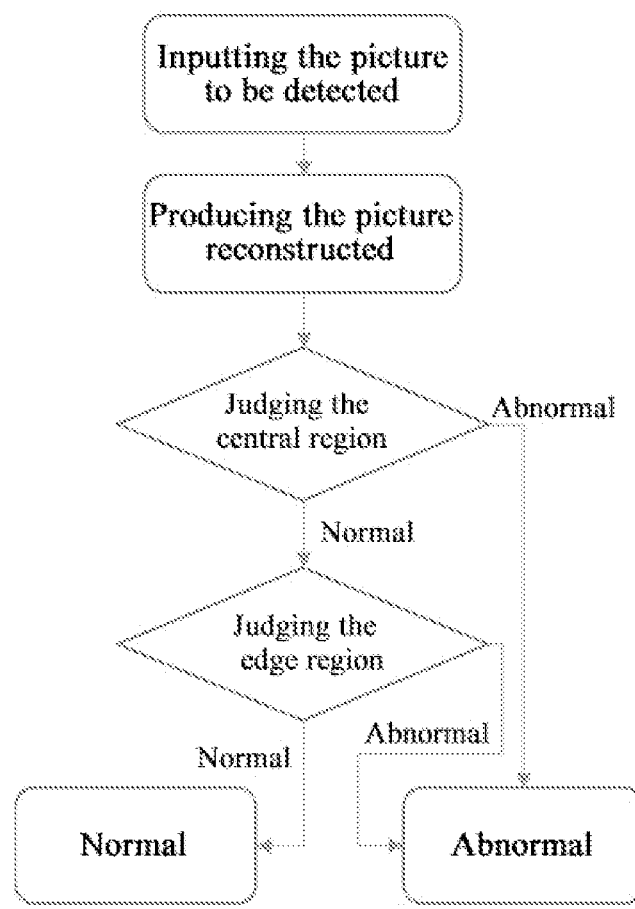
FIG. 6 is a flowchart of anomaly detection judgment of a computer vision-based anomaly detection method according to an embodiment of the present disclosure.

As shown in FIG. 6, still taking feature regions divided into the center and edge regions as an example, the present embodiment inputs the picture to be detected into the GAN network model to generate the picture reconstructed, then first determines whether the central region (the low diversity region) is normal. If the central region is abnormal, it is directly judged that the target to be detected is abnormal and the calculation stops; if it is judged that the central region is normal, then it is further judged whether the edge region (the high diversity region) is normal, if the high diversity region is also normal, then it can be judged that the target to be detected is normal; if the high diversity region is abnormal, it is judged that the target to be detected is abnormal.

In an embodiment of the present disclosure, performing pixel value-based difference detection on the generated picture and the target picture to be detected comprises:

calculating a pixel value difference between the low diversity region of the generated picture and the low diversity region of the target picture to be detected, and if a calculation result is not less than a first threshold, judging that the low diversity region of the target picture to be detected is abnormal, and stopping calculation; if a calculation result is less than the first threshold, judging that the low diversity region of the target picture to be detected is normal; continuing to calculate a pixel value difference between the high diversity region of the generated picture and the high diversity region of the target picture to be detected, and if a calculation result is not less than a second threshold, judging that the high diversity region of the target picture to be detected is abnormal; if a calculation result is less than the second threshold, judging that the target picture to be detected is normal.

In a preferred embodiment, performing pixel value-based difference detection on the generated picture and the target picture to be detected: calculating an average value of square of 2-norm of the pixel value differences of the target picture to be detected and the generated picture, and taking the average value as the calculation result indicating a difference of low diversity regions.

Specifically, for the low diversity region, a first formula as follows is used to calculate the average value of square of 2-norm of the pixel value differences:

$$L_c(x) = \frac{1}{n}\|x - G(x)\|^2 \quad \text{the first formula}$$

where n is a total number of pixels in the low diversity region, x is a pixel value of the target picture to be detected, and G(x) is a pixel value of the generated picture. Generally, when the target picture to be detected is normal, the value of the calculation result Lc will be relatively low, and when the target picture to be detected is an abnormal picture, the value of the calculation result Lc will be much higher than the normal picture. By setting an appropriate first threshold, it can be determined whether the target picture to be detected is abnormal, and the difference detection of the target to be detected can be realized.

Since the high diversity region has higher diversity, the reconstruction accuracy of the generated picture is not as good as that of the low diversity region. For this reason, the present embodiment uses another evaluation system to calculate the pixel value difference of the high diversity region.

Preferably, continuing to detect the difference between the high diversity region of the target picture to be detected and the high diversity region of the generated picture comprises: calculating a maximum pixel value difference and a cumulative pixel value difference between the target picture to be detected and the generated picture, wherein the second threshold value is a set of values; when neither the maximum pixel value difference nor the cumulative pixel value difference is less than a corresponding value in the second threshold, considering that the calculation result is not less than the second threshold, and judging that the high diversity region of the target picture to be detected is abnormal; wherein the maximum pixel value difference indicates a maximum value of the pixel value difference between a single target picture to be detected and a corresponding generated picture; the cumulative pixel value difference indicates a cumulative value of the pixel value differences between all target pictures belonging to a same target to be detected and the corresponding generated pictures.

Specifically, for the high diversity region, a second formula as follows is used to calculate a maximum pixel value difference between the target picture to be detected and the generated picture:

$$L_{b_{max}} = \max_m \left( \sum_{\substack{i=1 \\ j=1}}^{64} |x_m(i,j) - G(x_m(i,j))| \right), m \in [1, M] \quad \text{the second formula}$$

The following third formula is used to calculate the cumulative difference in pixel values between the target picture to be detected and the generated picture:

$$L_{b_{sum}} = \sum_{m=1}^{M} \left( \sum_{\substack{i=1 \\ j=1}}^{64} |x_m(i,j) - G(x_m(i,j))| \right) \quad \text{the third formula}$$

In the second formula and the third formula, (i, j) represents coordinates of each pixel in each picture in the high diversity region, and M is a total number of pictures in the high diversity region.

It can be determined whether the high diversity region is abnormal by combining the second formula and the third formula. Among them, $L_{bmax}$ can reflect the maximum difference in pixel values of a single picture in the high diversity region, and $L_{bsum}$ can reflect the cumulative difference in pixel values in the entire high diversity region. Since the generated pictures of high diversity regions are not as accurate as low diversity regions, if the same determination method as that of low diversity regions is still used, it will cause too many misjudgments, and normal pictures may be judged as abnormal. Therefore, the present embodiment designs this double loss function superposition method, and only when both the cumulative difference in pixel values in the high diversity region and the maximum difference in pixel values of a single picture reach the corresponding thresholds, the target to be detected is determined to be abnormal, so that it can ensure that after the target picture is segmented, the largest anomaly of each small picture and the small anomalies that continuously span multiple small pictures can be identified. Correspondingly, the second threshold is a set of values, namely, two thresholds are set respectively for $L_{bmax}$ and $L_{bsum}$. When neither $L_{bmax}$ nor $L_{bsum}$ is less than the corresponding threshold, it is judged that the high diversity region is abnormal.

In an embodiment of the present disclosure, the method further comprises the step of determining the first threshold and the second threshold by using a training set of pictures in a normal state, which comprises:

inputting respectively training sets of feature regions of target pictures in a normal state into a GAN network model after trained to obtain the generated picture, calculating the average values of square of 2-norm of pixel value differences in the low diversity regions, and selecting a value at a preset position above a median of the calculation results as the first threshold; and calculating maximum pixel value differences and cumulative pixel value differences of the high diversity region, and selecting respectively values at a preset position above a median of the calculation results to form the second threshold. Preferably, in the present embodiment, a value at a position of 15% or 20% or 25% above a median of the calculation results is selected respectively as the corresponding threshold (the first threshold or the second threshold).

Figure 7:
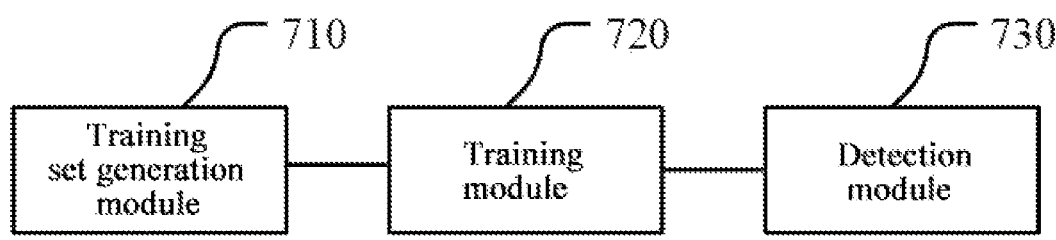
FIG. 7 is a schematic diagram of the structure of a computer vision-based anomaly detection device according to an embodiment of the present disclosure.

The present disclosure also discloses a computer vision-based anomaly detection device. As shown in FIG. 7, the device comprises: a training set generation module 710, a training module 720, and a detection module 730.

The training set generation module 710 is for dividing a target picture into at least two feature regions according to different region features of the target picture, and forming training sets respectively using the feature regions corresponding to each target picture.

The training module 720 is for selecting generative adversarial networks (GAN) as network models to be used, and training GAN network models with the training sets of different feature regions to obtain GAN network models corresponding to different feature regions.

The detection module 730 is for performing same feature region division on a target picture, inputting different feature regions of the target picture to be detected into corresponding GAN network models to obtain a generated picture, and performing pixel value-based difference detection on the generated picture and the target picture to be detected.

In an embodiment of the present disclosure, the training set generation module 710 is for dividing the target picture into a low diversity region and a high diversity region according to diversity of content of the target picture.

The detection module 730 is for performing difference detection on corresponding low diversity regions of the generated picture and the target picture to be detected, and when a detection result is abnormal, stopping calculation and directly determining the target to be detected as abnormal; when a detection result is normal, continuing to perform difference detection on corresponding high diversity regions of the generated picture and the target picture to be detected.

In an embodiment of the present disclosure, the training set generating module 710 is specifically for forming training sets respectively using feature regions of a target picture in a normal state.

The training module 720 is specifically for selecting wasserstein distance-based GAN networks (WGAN) as network models to be used, and training with the training sets to obtain WGAN network models capable of generating a picture with normal target features based on an input picture.

In an embodiment of the present disclosure, the training set generation module 710 is for dividing the target picture into a low diversity region and a high diversity region according to diversity of the target picture.

In an embodiment of the present disclosure, the training set generation module 710 and the detection module 730 are also for, before inputting the target picture into the GAN network model, resetting a resolution of the target picture so that the target picture is adjusted to an integer multiple of a preset pixel size, and dividing the target picture into multiple pictures according to the preset pixel size.

In an embodiment of the present disclosure, the detection module 730 is specifically for calculating a pixel value difference between the low diversity regions of the generated picture and the target picture to be detected, and if a calculation result is not less than a first threshold, judging that the low diversity region of the target picture to be detected is abnormal, and stopping calculation; if a calculation result is less than the first threshold, judging that the low diversity region of the target picture to be detected is normal; and continuing to calculate a pixel value difference between the high diversity regions of the generated picture and the target picture to be detected, and if a calculation result is not less than a second threshold, judging that the high diversity region of the target picture to be detected is abnormal; if a calculation result is less than the second threshold, judging that the target picture to be detected is normal.

In an embodiment of the present disclosure, the detection module 730 is specifically for calculating an average value of square of 2-norm of the pixel value differences of the target picture to be detected and the generated picture, and taking the average value as the calculation result indicating a difference of low diversity regions; and calculating a maximum pixel value difference and a cumulative pixel value difference between the target picture to be detected and the generated picture, wherein the second threshold value is a set of values; when neither the maximum pixel value difference nor the cumulative pixel value difference is less than a corresponding value in the second threshold, considering that the calculation result is not less than the second threshold, and judging that the high diversity region of the target picture to be detected is abnormal; wherein the maximum pixel value difference indicates a maximum value of the pixel value difference between a single target picture to be detected and a corresponding generated picture; the cumulative pixel value difference indicates a cumulative value of the pixel value differences between all target pictures belonging to a same target to be detected and the corresponding generated pictures.

Specifically, for the low diversity region, the detection module 730 may use the following first formula to calculate the average value of square of 2-norm of the pixel value differences:

$$L_c(x) = \frac{1}{n}\|x - G(x)\|^2$$

where n is a total number of pixels in the low diversity region, x is a pixel value of the target picture to be detected, and G(x) is a pixel value of the generated picture.

For the high diversity region, the detection module 730 may use the following second formula to calculate the maximum pixel value difference between the target picture to be detected and the generated picture:

$$L_{b_{max}} = \max_m \left( \sum_{\substack{i=1 \\ j=1}}^{64} |x_m(i,j) - G(x_m(i,j))| \right), m \in [1, M]$$

The following third formula may be used to calculate the cumulative pixel value difference between the target picture to be detected and the generated picture:

$$L_{b_{sum}} = \sum_{m=1}^{M} \left( \sum_{\substack{i=1 \\ j=1}}^{64} |x_m(i,j) - G(x_m(i,j))| \right)$$

In the second and third formulas, (i, j) represents coordinates of each pixel in each picture in the high diversity region, and M is a total number of pictures in the high diversity region.

Figure 8:
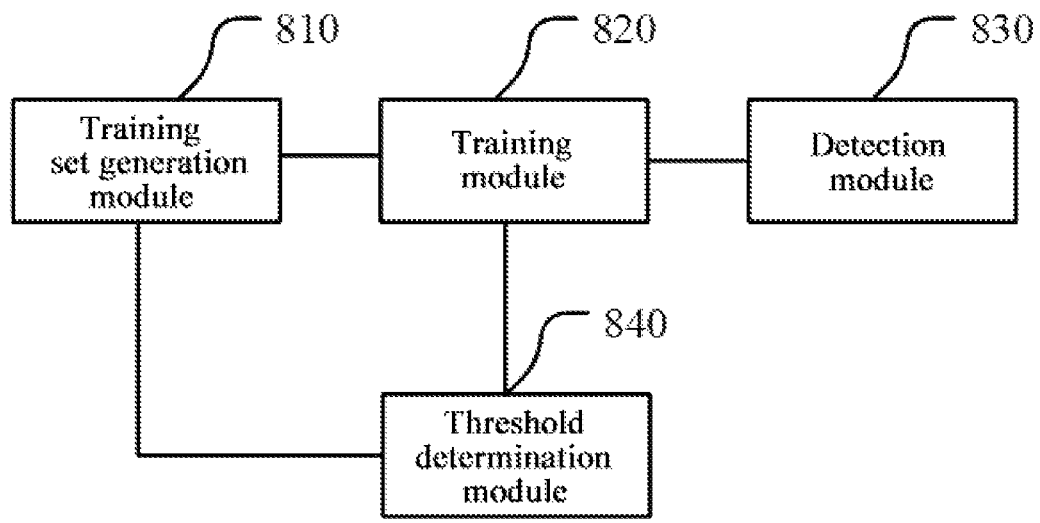
FIG. 8 is a schematic diagram of the structure of a computer vision-based anomaly detection device according to another embodiment of the present disclosure.

FIG. 8 is another embodiment of the computer vision-based anomaly detection device of the present disclosure. As shown in FIG. 8, the device includes: a training set generation module 810, a training module 820, a detection module 830, and a threshold determination module 840.

The threshold determination module 840 is for inputting respectively training sets of feature regions of target pictures in a normal state into a GAN network model after trained to obtain the generated picture, calculating the average values of square of 2-norm of pixel value differences in the low diversity regions, and selecting a value at a preset position above a median of the calculation results as the first threshold; and calculating maximum pixel value differences and cumulative pixel value differences of the high diversity region, and selecting respectively values at a preset position above a median of the calculation results to form the second threshold. Preferably, in the present embodiment, a value at a position of 15% or 20% or 25% above a median of the calculation results is selected respectively as the corresponding threshold (the first threshold or the second threshold).

The working principle of the computer vision-based anomaly detection device according to the present embodiment is corresponding to and same as the above computer vision-based anomaly detection method. For the specific formulas used and parameter selections, please refer to the description in the above method embodiments, which will not be repeated here.

Figure 9:
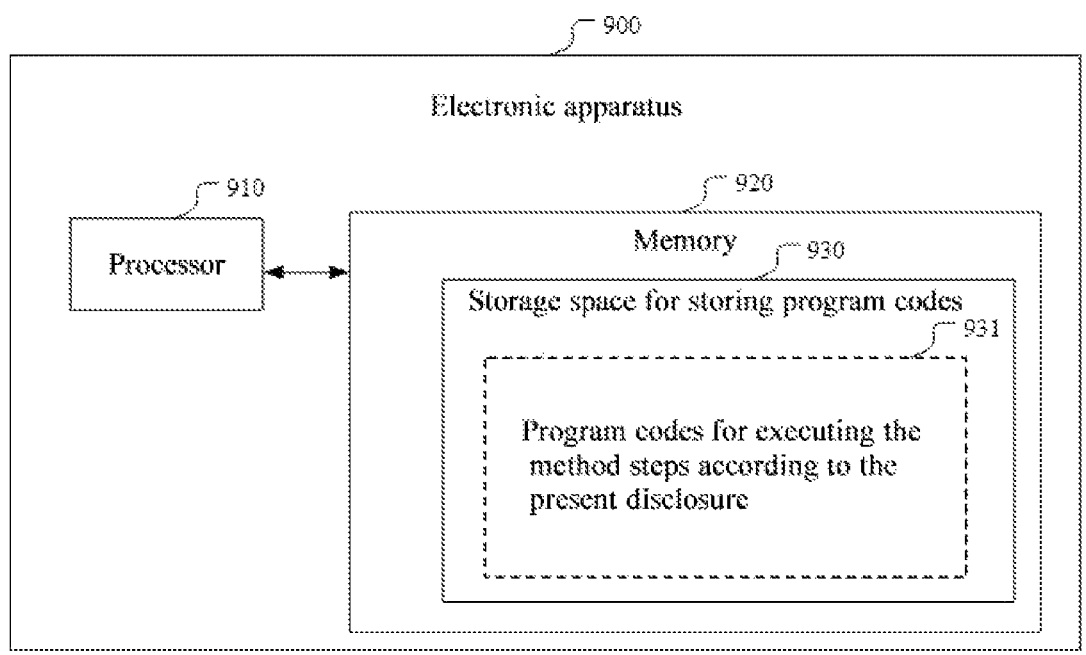
FIG. 9 is a schematic diagram of the structure of an electronic apparatus according to another embodiment of the present disclosure.

FIG. 9 is a schematic diagram of the structure of an electronic apparatus according to an embodiment of the present disclosure. The electronic apparatus 900 includes a processor 910 and a memory 920 arranged to store computer-executable instructions (computer readable program codes). The memory 920 may be an electronic memory such as flash memory, EEPROM (electrically erasable programmable read only memory), EPROM, hard disk, or ROM. The memory 920 has a storage space 930 for storing computer readable program codes 931 for executing any method steps in the above methods. For example, the storage space 930 for storing computer readable program codes may include various computer readable program codes 931 respectively used to implement various steps in the above method. The computer readable program code 931 may be read from or written into one or more computer program products. These computer program products include program code carriers such as hard disks, compact disks (CDs), memory cards or floppy disks. Such a computer program product is typically a computer readable storage medium.

Specifically, the executable instructions stored in the memory 920, when executed, cause the processor to perform the following processing:

dividing a target picture into at least two feature regions according to different region features of the target picture, and forming training sets respectively using the feature regions corresponding to each target picture;

selecting generative adversarial networks (GAN) as network models to be used, and training GAN network models with the training sets of different feature regions to obtain GAN network models corresponding to different feature regions; and when performing anomaly detection, performing same feature region division on a target picture to be detected, inputting different feature regions of the target picture to be detected into corresponding GAN network models to obtain a generated picture, and performing pixel value-based difference detection on the generated picture and the target picture to be detected.

Further, the executable instructions, when executed, further cause the processor to perform the following processing:

dividing the target picture into a low diversity region and a high diversity region according to diversity of content of the target picture;

performing difference detection on corresponding low diversity regions of the generated picture and the target picture to be detected, and when a detection result is abnormal, stopping calculation and directly determining the target to be detected as abnormal; and when a detection result is normal, continuing to perform difference detection on corresponding high diversity regions of the generated picture and the target picture to be detected.

Further, the executable instructions, when executed, further cause the processor to perform the following processing:

calculating a pixel value difference between the low diversity regions of the generated picture and the target picture to be detected, and if a calculation result is not less than a first threshold, judging that the low diversity region of the target picture to be detected is abnormal, and stopping calculation; if a calculation result is less than the first threshold, judging that the low diversity region of the target picture to be detected is normal; and continuing to calculate a pixel value difference between the high diversity regions of the generated picture and the target picture to be detected, and if a calculation result is not less than a second threshold, judging that the high diversity region of the target picture to be detected is abnormal; if a calculation result is less than the second threshold, judging that the target picture to be detected is normal.

Yet another embodiment of the present disclosure provides a computer readable storage medium. The computer readable storage medium stores the computer readable program codes for executing the method steps according to the present disclosure, which can be read by the processor of the electronic apparatus. When the computer readable program codes are run by the electronic apparatus, the electronic apparatus is caused to execute each step in the methods described above. Specifically, the computer readable program codes stored in the computer readable storage medium can execute the methods shown in any of the above embodiments. The computer readable program codes may be compressed in an appropriate form.

The specific functions implemented by the codes in the computer readable storage medium and electronic apparatus according to the present embodiment are corresponding to the computer vision-based anomaly detection method above, and the details may refer to the description in the foregoing method embodiments, which will not be repeated herein.

The above are only specific embodiments of the present disclosure. Based on the above teaching of the present disclosure, those skilled in the art can make other improvements or modifications based on the above embodiments. Those skilled in the art should understand that the detailed description above is only for the purpose of better explaining the present disclosure, and the protection scope of the present disclosure should be subject to the protection scope of the claims.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A computer vision-based anomaly detection method, comprising:
   dividing a target picture into at least two feature regions according to different region features of the target picture, and forming training sets respectively using the feature regions corresponding to multiple target pictures;
   selecting generative adversarial networks (GAN) as network models to be used, and training GAN network models with the training sets of different feature regions to obtain GAN network models corresponding to different feature regions; and
   in the process of performing anomaly detection, performing same feature region division on a target picture to be detected, inputting different feature regions of the target picture to be detected into corresponding GAN network models to obtain a generated picture, and performing pixel value-based difference detection on the generated picture and the target picture to be detected,
   wherein dividing a target picture into at least two feature regions according to different region features of the target picture comprises:
   dividing the target picture into a low diversity region and a high diversity region according to diversity of content of the target picture.

2. The computer vision-based anomaly detection method according to claim 1, wherein forming training sets respectively using the feature regions corresponding to multiple target pictures comprises:
   forming training sets respectively using feature regions of a target picture in a normal state;
   selecting generative adversarial networks (GAN) as network models to be used, and training GAN network models with the training sets of different feature regions comprises:
   selecting wasserstein distance-based GAN networks (WGAN) as network models to be used, and training with the training sets to obtain WGAN network models capable of generating a picture with normal target features based on an input picture.

3. The computer vision-based anomaly detection method according to claim 1, wherein performing pixel value-based difference detection on the generated picture and the target picture to be detected comprises:
   performing difference detection on corresponding low diversity regions of the generated picture and the target picture to be detected, and when a detection result is abnormal, stopping calculation and directly determining the target to be detected as abnormal;
   when a detection result is normal, continuing to perform difference detection on corresponding high diversity regions of the generated picture and the target picture to be detected.

4. The computer vision-based anomaly detection method according to claim 3, wherein performing pixel value-based difference detection on the generated picture and the target picture to be detected comprises:
   calculating a pixel value difference between the low diversity regions of the generated picture and the target picture to be detected, and if a calculation result is not less than a first threshold, judging that the low diversity region of the target picture to be detected is abnormal, and stopping calculation; if a calculation result is less than the first threshold, judging that the low diversity region of the target picture to be detected is normal; and
   continuing to calculate a pixel value difference between the high diversity regions of the generated picture and the target picture to be detected, and if a calculation result is not less than a second threshold, judging that the high diversity region of the target picture to be detected is abnormal; if a calculation result is less than the second threshold, judging that the target picture to be detected is normal.

5. The computer vision-based anomaly detection method according to claim 3, wherein performing pixel value-based difference detection on the generated picture and the target picture to be detected comprises:
   calculating an average value of square of 2-norm of the pixel value differences of the target picture to be detected and the generated picture, and taking the average value as a calculation result indicating a difference of low diversity regions.

6. The computer vision-based anomaly detection method according to claim 5, wherein
   for the low diversity region, a first formula as follows is used to calculate the average value of square of 2-norm of the pixel value differences:

$$L_c(x) = \frac{1}{n}\|x - G(x)\|^2$$

where n is a total number of pixels in the low diversity region, x is a pixel value of the target picture to be detected, and G(x) is a pixel value of the generated picture.

7. The computer vision-based anomaly detection method according to claim 5, further comprising:
   inputting respectively training sets of feature regions of target pictures in a normal state into a GAN network model after trained to obtain the generated pictures, calculating the average values of square of 2-norm of pixel value differences in the low diversity regions, and selecting a value at a preset position above a median of the calculation results as the first threshold; and
   calculating maximum pixel value differences and cumulative pixel value differences of the high diversity regions, and selecting respectively values at a preset position above a median of the calculation results to form the second threshold.

8. The computer vision-based anomaly detection method according to claim 1, further comprising:
   before inputting the target picture into the GAN network model, resetting a resolution of the target picture so that the target picture is adjusted to an integer multiple of a preset pixel size, and dividing the target picture into multiple pictures according to the preset pixel size.

9. The computer vision-based anomaly detection method according to claim 5, wherein
   for the high diversity region, a second formula as follows is used to calculate a maximum pixel value difference between the target picture to be detected and the generated picture:

$$L_{b_{max}} = \max_m \left( \sum_{\substack{i=1 \\ j=1}}^{64} |x_m(i,j) - G(x_m(i,j))| \right), m \in [1, M]$$

where (i, j) represents coordinates of each pixel in each picture in the high diversity region, and M is a total number of pictures in the high diversity region.

10. The computer vision-based anomaly detection method according to claim 3, wherein performing difference detection on corresponding high diversity regions of the generated picture and the target picture to be detected comprises:
calculating a maximum pixel value difference and a cumulative pixel value difference between the target picture to be detected and the generated picture; when neither the maximum pixel value difference nor the cumulative pixel value difference is less than a corresponding value in the second threshold, considering that the calculation result is not less than the second threshold, and judging that the high diversity region of the target picture to be detected is abnormal;
wherein the second threshold value is a set of values;
the maximum pixel value difference indicates a maximum value of the pixel value difference between a single target picture to be detected and a corresponding generated picture; and
the cumulative pixel value difference indicates a cumulative value of the pixel value differences between all target pictures belonging to a same target to be detected and the corresponding generated pictures.

11. The computer vision-based anomaly detection method according to claim 10, wherein a third formula as follows is used to calculate the cumulative pixel value difference between the target picture to be detected and the generated picture:

$$L_{b_{sum}} = \sum_{m=1}^{M} \left( \sum_{\substack{i=1 \\ j=1}}^{64} |x_m(i,j) - G(x_m(i,j))| \right)$$

where (i, j) represents coordinates of each pixel in each picture in the high diversity region, and M is a total number of pictures in the high diversity region.

12. The computer vision-based anomaly detection method according to claim 7, wherein
a value at a position of 15% or 20% or 25% above a median of the calculation results is selected respectively to be the first threshold or the second threshold.

13. A computer-readable storage medium storing computer instructions that cause a computer to perform the following processing:
dividing a target picture into at least two feature regions according to different region features of the target picture, and forming training sets respectively using the feature regions corresponding to multiple target pictures;
selecting generative adversarial networks (GAN) as network models to be used, and training GAN network models with the training sets of different feature regions to obtain GAN network models corresponding to different feature regions; and
performing same feature region division on a target picture to be detected, inputting different feature regions of the target picture to be detected into corresponding GAN network models to obtain a generated picture, and performing pixel value-based difference detection on the generated picture and the target picture to be detected,
wherein dividing a target picture into at least two feature regions according to different region features of the target picture comprises:
dividing the target picture into a low diversity region and a high diversity region according to diversity of content of the target picture.

14. The computer-readable storage medium according to claim 13, wherein the computer instructions further cause the computer to perform the following processing:
performing difference detection on corresponding low diversity regions of the generated picture and the target picture to be detected, and when a detection result is abnormal, stopping calculation and directly determining the target to be detected as abnormal; when a detection result is normal, continuing to perform difference detection on corresponding high diversity regions of the generated picture and the target picture to be detected.

15. The computer-readable storage medium according to claim 14, wherein the computer instructions further cause the computer to perform the following processing:
calculating a pixel value difference between the low diversity regions of the generated picture and the target picture to be detected, and if a calculation result is not less than a first threshold, judging that the low diversity region of the target picture to be detected is abnormal, and stopping calculation; if a calculation result is less than the first threshold, judging that the low diversity region of the target picture to be detected is normal; and
continuing to calculate a pixel value difference between the high diversity regions of the generated picture and the target picture to be detected, and if a calculation result is not less than a second threshold, judging that the high diversity region of the target picture to be detected is abnormal; if a calculation result is less than the second threshold, judging that the target picture to be detected is normal.

16. The computer-readable storage medium according to claim 15, wherein the computer instructions further cause the computer to perform the following processing:
inputting respectively training sets of feature regions of target pictures in a normal state into a GAN network model after trained to obtain the generated pictures, calculating the average values of square of 2-norm of pixel value differences in the low diversity regions, and selecting a value at a preset position above a median of the calculation results as the first threshold; and
calculating maximum pixel value differences and cumulative pixel value differences of the high diversity regions, and selecting respectively values at a preset position above a median of the calculation results to form the second threshold.

\* \* \* \* \*